(12) United States Patent
Shiokawa et al.

(10) Patent No.: US 10,940,632 B2
(45) Date of Patent: Mar. 9, 2021

(54) LIQUID BLOW MOLDING METHOD

(71) Applicant: YOSHINO KOGYOSHO CO., LTD., Tokyo (JP)

(72) Inventors: Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/765,566

(22) PCT Filed: Oct. 3, 2018

(86) PCT No.: PCT/JP2018/037104
§ 371 (c)(1),
(2) Date: May 20, 2020

(87) PCT Pub. No.: WO2019/106955
PCT Pub. Date: Jun. 6, 2019

(65) Prior Publication Data
US 2020/0307062 A1 Oct. 1, 2020

(30) Foreign Application Priority Data

Nov. 30, 2017 (JP) .............................. JP2017-230492

(51) Int. Cl.
*B29C 49/46* (2006.01)
*B29C 49/12* (2006.01)
(Continued)

(52) U.S. Cl.
CPC .............. *B29C 49/46* (2013.01); *B29C 49/12* (2013.01); *B29C 49/06* (2013.01);
(Continued)

(58) Field of Classification Search
CPC ............ B29C 49/46; B29C 2049/4664; B29C 2049/4658; B29C 49/4252; B29C 2049/4697; B29C 49/4236; B29C 49/58
See application file for complete search history.

(56) References Cited

U.S. PATENT DOCUMENTS

2003/0077349 A1* 4/2003 Derouault .............. B29O 49/78
425/145

FOREIGN PATENT DOCUMENTS

JP   2000-043129 A   2/2000
JP   2015-506288 A   3/2015
(Continued)

OTHER PUBLICATIONS

Dec. 18, 2018 International Search Report issued in International Patent Application No. PCT/JP2018/037104.

*Primary Examiner* — Robert B Davis
(74) *Attorney, Agent, or Firm* — Oliff PLC (57) ABSTRACT

A liquid blow molding method of molding a synthetic resin preform having a mouth portion into a liquid container of a predetermined shape, the method including: an air-liquid replacement step of exhausting the air inside the preform to the outside while a liquid is supplied into the preform from the mouth portion through a blow nozzle; an air-liquid separation step of separating the air from the liquid inside the preform by rotating the preform about an axial center of the mouth portion; and a blow molding step of molding the preform into a container of a predetermined shape by supplying a pressurized liquid into the preform from the mouth portion through the blow nozzle, after the air-liquid separation step.

7 Claims, 8 Drawing Sheets

(51) Int. Cl.
  *B29C 49/06* (2006.01)
  *B29C 49/42* (2006.01)
  *B29K 23/00* (2006.01)
  *B29L 31/00* (2006.01)

(52) U.S. Cl.
  CPC .. *B29C 49/4289* (2013.01); *B29C 2049/4294* (2013.01); *B29C 2049/4664* (2013.01); *B29K 2023/12* (2013.01); *B29L 2031/7158* (2013.01)

(56) References Cited

FOREIGN PATENT DOCUMENTS

| | | |
|---|---|---|
| JP | 5806929 B2 | 11/2015 |
| JP | 2016-210037 A | 12/2016 |
| JP | 2016-537227 A | 12/2016 |
| WO | 2018/079012 A1 | 5/2018 |
| WO | 2018/198449 A1 | 11/2018 |

* cited by examiner

LIQUID BLOW MOLDING METHOD

TECHNICAL FIELD

The present disclosure relates to a liquid blow molding method of molding a synthetic resin preform having a mouth portion into a liquid container of a predetermined shape.

BACKGROUND

Synthetic resin containers, representative examples of which including polypropylene (PP) bottles and polyethylene terephthalate (PET) bottles, are used to contain, as content liquids, various liquids such as beverages, cosmetics, medicines, detergents and toiletries such as shampoos. Such containers are generally manufactured by blow molding a preform formed of a thermoplastic synthetic resin material described above into a bottomed tubular shape, for example.

As a blow molding for molding a preform into a container, a liquid blow molding is known, in which, as a pressure medium supplied into a preform, a pressurized liquid is used instead of the pressurized air.

For example, Patent Literature (PTL) 1 discloses a liquid blow molding method in which a synthetic resin preform heated in advance to a temperature at which stretchability is achieved is placed in a mold for blow molding, and a liquid pressurized to a predetermined pressure is supplied into the preform through a blow nozzle. In this manner the preform is molded into a container of a predetermined shape conforming to a cavity of the mold. According to the liquid blow molding method described above, as a liquid supplied into a preform, a content liquid such as beverage contained finally in a container as a product is used, and molding of a container and filling of a content liquid into the container are performed at the same time, thus a liquid container containing a content liquid can be molded (manufactured) easily. In this manner, a step of filling a content liquid into a container after molding is omitted, and thus a configuration of its production process or production line (apparatus) can be simplified.

CITATION LIST

Patent Literature

PTL 1: JP5806929 (B2)

SUMMARY

Technical Problem

However, in the existing liquid blow molding method disclosed in PTL 1, when a liquid is supplied as a pressure medium into a preform, the liquid entrains the air present in the preform. Thus bubbling of the liquid occurs inside the preform, which may cause a problem such as a decline in stability of molding conditions, moldability of a container, and the like The present disclosure has been conceived in view of the above described problem, and it is an object of the present disclosure to provide a liquid blow molding method in which a liquid container can be manufactured so that it has a predetermined content volume and a shape precisely and at a low cost.

Solution to Problem

A disclosed liquid blow molding method is a liquid blow molding method of molding a synthetic resin preform having a mouth portion into a liquid container of a predetermined shape, the method including: an air-liquid replacement step of exhausting the air inside the preform to the outside while supplying a liquid into the preform from the mouth portion through a blow nozzle; an air-liquid separation step of separating the air from the liquid inside the preform by rotating the preform about an axial center of the mouth portion; and a blow molding step of molding the preform into a container of a predetermined shape by supplying a pressurized liquid into the preform from the mouth portion through the blow nozzle, after the air-liquid separation step.

In the disclosed liquid blow molding method configured in the above described manner, preferably, the air-liquid separation step is performed while the air-liquid replacement step is performed.

In the disclosed liquid blow molding method configured in the above described manner, preferably, the air-liquid separation step is performed after the air-liquid replacement step is completed.

In the disclosed liquid blow molding method configured in the above described manner, preferably, in the air-liquid separation step, the preform is held by a holding portion provided to the blow nozzle and is rotated along with the holding portion.

In the disclosed liquid blow molding method configured in the above described manner, preferably, the method has a nozzle engagement step of engaging the blow nozzle with the mouth portion before the air-liquid replacement step, and in the air-liquid replacement step, while a liquid is supplied into the preform from the mouth portion through a liquid supply port of the blow nozzle, the air inside the preform is exhausted to the outside from an exhaust port provided in the blow nozzle separately from the liquid supply port.

In the disclosed liquid blow molding method configured in the above described manner, preferably, the method further includes:

a first nozzle lowering step of lowering the blow nozzle to a first position at which the mouth portion is not sealed, before the air-liquid replacement step; and a second nozzle lowering step of lowering the blow nozzle to a second position at which the mouth portion is sealed, after the air-liquid replacement step, wherein, in the air-liquid replacement step, while a liquid is supplied into the preform from the mouth portion through the blow nozzle located at the first position, the air inside the preform is exhausted from a gap between the blow nozzle and the mouth portion; and the blow molding step is performed after the second nozzle lowering step.

In the disclosed liquid blow molding method configured in the above described manner, preferably, the method includes a suck-back step of sucking back a predetermined amount of liquid from inside of the container after molding through the blow nozzle, after the blow molding step.

Advantageous Effect

According to the present disclosure, a liquid blow molding method is provided, in which a liquid container can be manufactured so that it has a predetermined content volume and a shape precisely and at a low cost.

DETAILED DESCRIPTION

The present disclosure will be described in more detail below with reference to the drawings.

The disclosed liquid blow molding method is a liquid blow molding method of molding a synthetic resin preform having a mouth portion into a liquid container of a predetermined shape, the method including: an air-liquid replacement step of exhausting the air inside the preform to the outside while supplying a liquid into the preform from the mouth portion through a blow nozzle; an air-liquid separation step of separating the air from the liquid inside the preform by rotating the preform about an axial center of the mouth portion; and a blow molding step of molding the preform into a container of a predetermined shape by supplying a pressurized liquid into the preform from the mouth portion through the blow nozzle, after the air-liquid separation step. The disclosed liquid blow molding method described above can be said as a liquid container manufacturing method of manufacturing a liquid container containing a content liquid from a preform.

Figure 1:
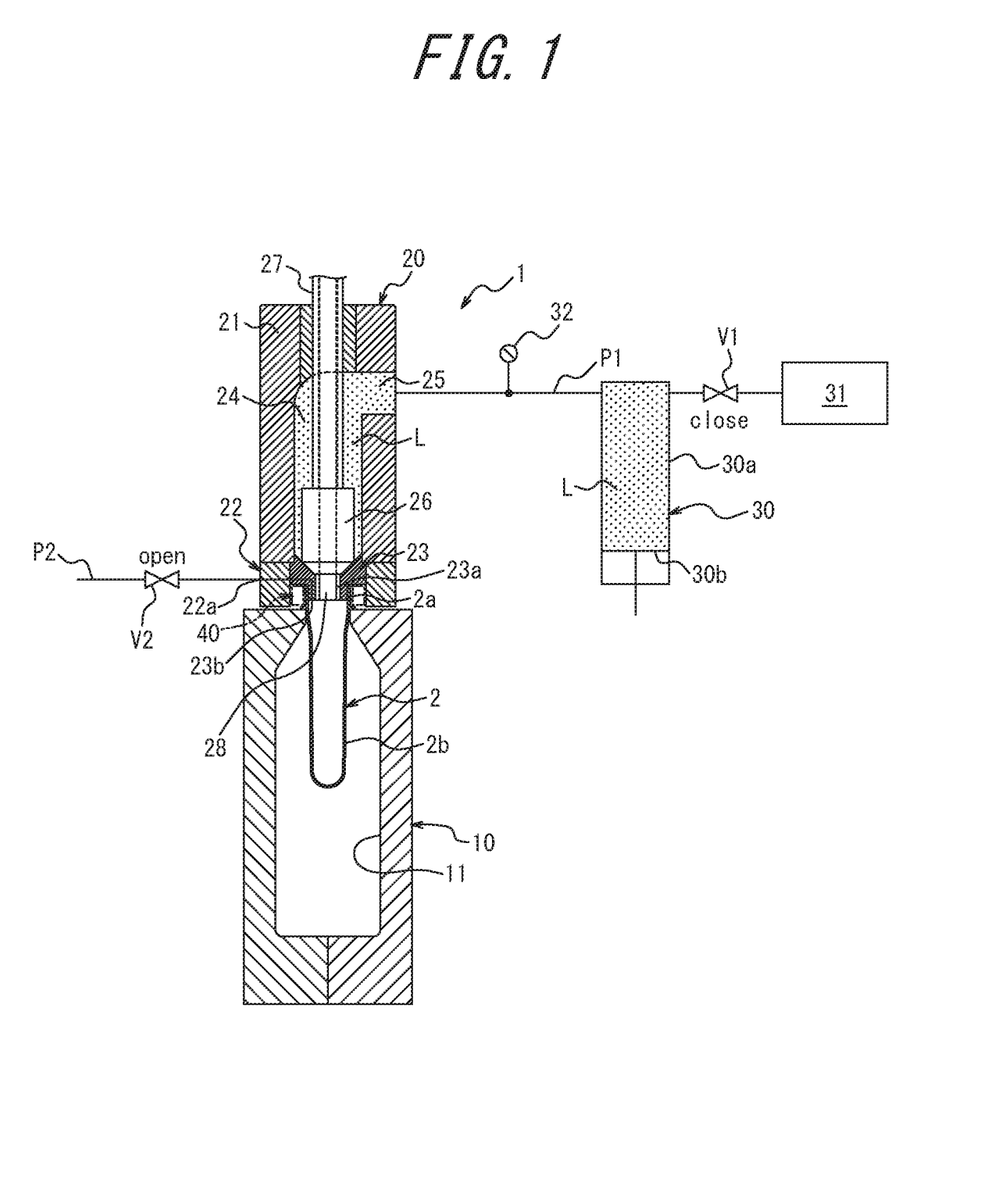
FIG. 1 is a diagram illustrating an example of a liquid blow molding apparatus used for a liquid blow molding method according to an embodiment of the present disclosure.

The disclosed liquid blow molding method can be performed by using a liquid blow molding apparatus 1 configured as illustrated in FIG. 1, for example.

The liquid blow molding apparatus 1 illustrated in FIG. 1 molds a synthetic resin preform 2 into a liquid container containing a content liquid by liquid blow molding. Here, the liquid blow molding is a blow molding in which, as a pressure medium (pressurized fluid) supplied to the preform 2, a pressurized liquid is used instead of the pressurized air used for the air blow molding.

As a liquid L supplied to the preform 2, that is, the content liquid L contained in a liquid container after molding, a variety of liquids such as, for example, beverages, cosmetics, medicines, detergents and toiletries such as shampoos can be used.

As the preform 2, preferably, a preform formed by a thermoplastic synthetic resin material such as polypropylene (PP) and polyethylene terephthalate (PET), for example, into a bottomed tubular shape having a cylindrical mouth portion 2a, which is an open end, and a cylindrical body portion 2b continuing to the mouth portion 2a and having a closed lower end is used.

It is to be noted that the shape of the preform 2 is not limited to the above described one, and a preform 2 having a variety of shapes can be used according to the shape, etc., of the container after molding, as long as it has a mouth portion 2a.

Although not illustrated in detail, on the outer wall surface of the mouth portion 2a of the preform 2 is provided with an engaging protrusion configured to mount a plug cap (not illustrated) to the mouth portion 2a of the liquid container after molding by plugging (undercut engagement). It is to be noted that, instead of the engaging protrusion, a male thread may be provided to the outer wall surface of the mouth portion 2a so as to mount the plug cap to the mouth portion 2a through thread connection.

The liquid blow molding apparatus 1 has a mold 10 for blow molding. The mold 10 has a cavity 11 having a shape corresponding to a final shape of a container, such as a bottle shape, for example. The cavity 11 opens upward on the upper surface of the mold 10. The preform 2 is placed in the mold 10 with the body portion 2b disposed inside the cavity 11 of the mold 10 and with the mouth portion 2a protruded upward from the mold 10.

Although not illustrated in detail, the mold 10 can be opened right and left, and after the preform 2 is molded into a liquid container, the liquid container can be ejected from the mold 10 by opening the mold 10 right and left.

Above the mold 10 is provided with a nozzle unit 20 configured to supply a liquid L into the preform 2. The nozzle unit 20 has a main body block 21, and the main body block 21 is vertically displaceable relative to the mold 10. The lower end of the main body block 21 is provided with a support block 22, and a blow nozzle 23 is mounted to the lower end of the main body block 21 by being supported by the support block 22. The blow nozzle 23 is formed into a substantially cylindrical shape, and when the nozzle unit 20 is displaced relative to the mold 10 to a stroke end in the direction approaching the mold 10, the blow nozzle 23 is engaged hermetically, from above, with the mouth portion 2a of the preform 2 placed in the mold 1.

Figure 2:
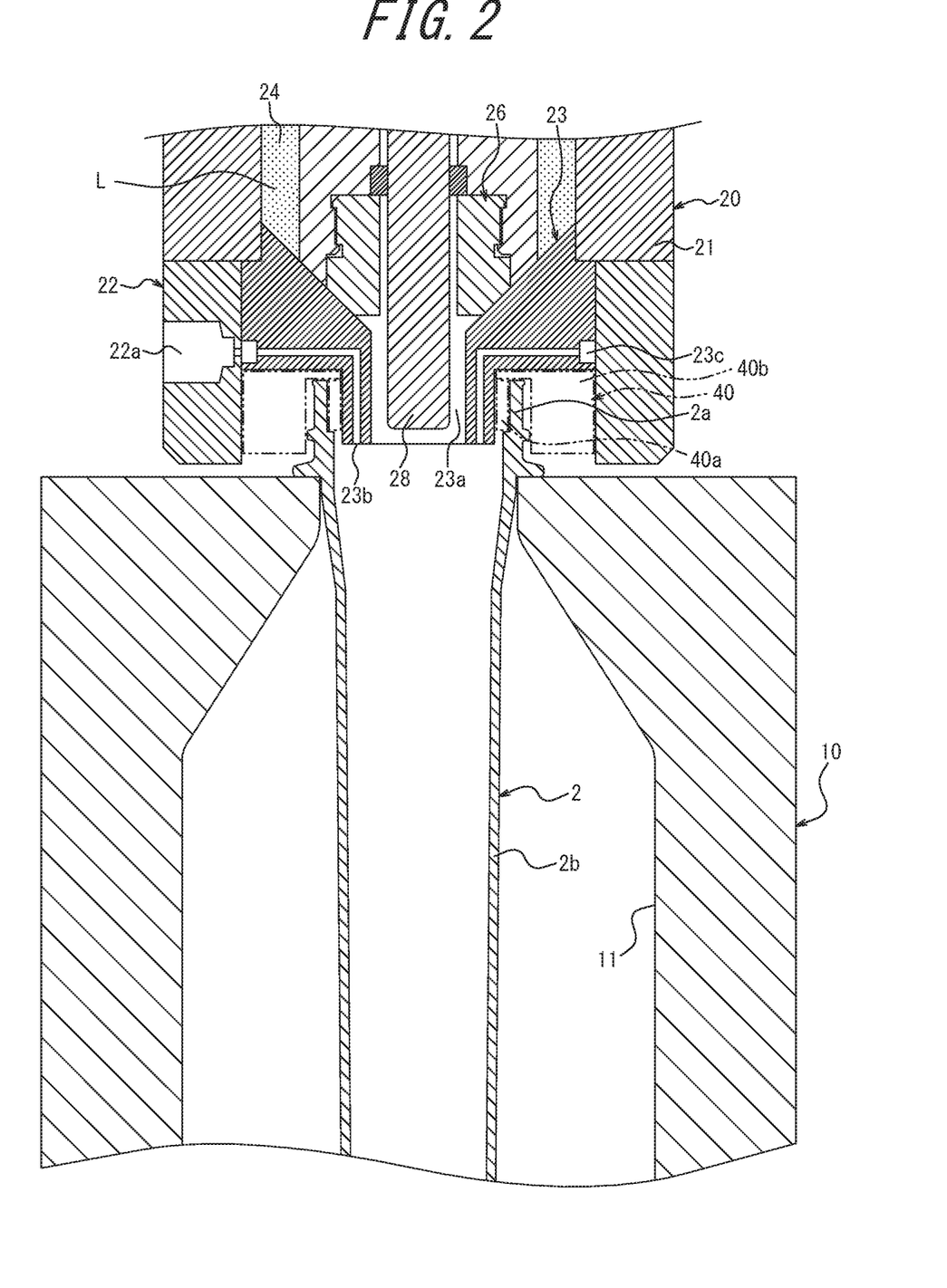
FIG. 2 is an enlarged view of a main part of the liquid blow molding apparatus illustrated in FIG. 1.

As illustrated in FIG. 2, inside the cylindrical portion of the blow nozzle 23 is a liquid supply port 23a. Further, in the cylindrical portion forming the liquid supply port 23a of the blow nozzle 23 is provided with an exhaust port 23b that opens at the lower end of the cylindrical portion. In the present embodiment, the cylindrical portion of the blow nozzle 23 is provided with eight exhaust ports 23b that are circumferentially arranged side by side at regular intervals. The number thereof may be changed.

As illustrated in FIG. 1, inside the main body block 21 is provided with a supply channel 24 that extends in the vertical direction. The supply channel 24 is a flow channel configured to supply a liquid L to the liquid supply port 23a of the blow nozzle 23, and communicates with the liquid supply port 23a of the blow nozzle 23 at the lower end thereof.

The main body block 21 is also provided with a supply port 25 that communicates with the upper end of the supply channel 24.

Inside the supply channel 24 is provided with a seal body 26 configured to open/close the liquid supply port 23a of the blow nozzle 23. The seal body 26 is fixed to the lower end of a shaft body 27 provided vertically displaceable relative to the nozzle unit 20, and is vertically displaceable inside the supply channel 24. The seal body 26 is formed into a columnar shape. When the seal body 26 is displaced to the close position, which is a stroke end position on the lower side, it comes in contact with the upper surface of the blow nozzle 23 on the lower end surface thereof and closes the liquid supply port 23*a* of the blow nozzle 23. On the other hand, when the seal body 26 is displaced upward from the close position, the liquid supply port 23*a* of the blow nozzle 23 is opened and communicated with the supply channel 24. It is to be noted that the seal body 26 may be formed integrally with the shaft body 27.

As illustrated, the liquid blow molding apparatus 1 may include a stretching rod 28. The stretching rod 28 is inserted into an axial center of the shaft body 27 to be vertically displaceable relative to the shaft body 27, and is provided to be extendable and retractable from the lower end of the seal body 26 through the axial center of the seal body 26. The stretching rod 28 is driven by a driving source not illustrated and is displaced downward, thus can axially stretch the preform 2. In this manner, when the stretching rod 28 is provided, the liquid blow molding apparatus 1 can perform a biaxial stretch blow molding in which the preform 2 is stretched axially by the stretching rod 28 and is stretched radially by a pressurized liquid L supplied from the mouth portion 2*a*.

It is to be noted that the liquid blow molding apparatus 1 may not include the stretching rod 28, and may be configured to liquid blow mold the preform 2 by using a pressurized liquid L only.

A pump 30 is connected to the supply port 25 through a pipe P1. The pump 30 can be configured as a plunger pump that includes a cylinder 30*a* and a piston (plunger) 30*b*, for example.

A supply tank 31 is connected to the pump 30. The supply tank 31 can be configured to store a liquid L and to heat the liquid L up to a predetermined temperature and hold the liquid L at the temperature. A flow channel between the pump 30 and the supply tank 31 is provided with an opening-closing valve V1, and the flow channel can be opened/closed by the opening-closing valve V1. It is to be noted that the reference sign 32 represents a pressure gauge provided to the pipe P1.

As illustrated in FIG. 2, each of a plurality of exhaust ports 23*b* provided in the blow nozzle 23 is communicated, through flow channels, with a connection channel 23*c* provided annularly on the outer periphery of the blow nozzle 23, each of the flow channels extending upward and bending radially outward. The connection channel 23*c* is connected to a connection port 22*a* on the side of the support block 22. As illustrated in FIG. 1, a pipe P2 is connected to the connection port 22*a*, and the connection port 22*a* is connected to an exhaust tank (not illustrated) through the pipe P2. That is, a plurality of exhaust ports 23*b* provided in the blow nozzle 23 are each connected to the exhaust tank. It is to be noted that, the pipe P2 may be connected also to a suction pump for exhaust, instead of an exhaust tank. The pipe P2 is provided with an opening-closing valve V2 that opens/closes the pipe P2.

The pump 30 is operated in the positive direction (the pressurized direction) with the seal body 26 displaced upward to open the liquid supply port 23*a* and with the opening-closing valve V1 closed. In this manner, the liquid L pressurized up to a predetermined pressure can be supplied into the preform 2 through the pipe P1, the supply port 25, the supply channel 24 and the liquid supply port 23*a* of the blow nozzle 23. Further, the pump 30 is operated in the reverse direction with the liquid supply port 23*a* closed by the seal body 26 and with the opening-closing valve V1 open. In this manner, the liquid L stored in the supply tank 31 is sucked into the cylinder 30*a* so as to be prepared for the next liquid blow molding.

The liquid blow molding apparatus 1 is provided with a rotary drive portion 40 configured to rotate the preform 2 placed in the mold 10 about the axial center of its mouth portion 2*a*. As illustrated in FIG. 2, in this embodiment, the rotary drive portion 40 has a holding portion 40*a* that is provided to the outer periphery of a tip portion of the blow nozzle 23 rotatably relative to the tip portion and can hold the mouth portion 2*a* of the preform 2 from inside thereof, and a drive mechanism 40*b* that is disposed radially outward of the holding portion 40*a* across the mouth portion 2*a* of the preform 2 and rotates the holding portion 40*a*. The drive mechanism 40*b* can transmit a driving force from a drive source (not illustrated) such as an electric motor (not illustrated) and the like to the holding portion 40*a*. The rotary drive portion 40 configured in the above described manner can rotate the preform 2, along with the holding portion 40*a*, about the axial center of the mouth portion 2*a* by rotating the holding portion 40*a* by the drive mechanism 40*b* with the mouth portion 2*a* of the preform 2 held by the holding portion 40*a*.

It is to be noted that the holding portion 40*a* holds the mouth portion 2*a* in a state where it comes in contact with the inner surface of the mouth portion 2*a* of the preform 2 in a liquid tight manner and thus can act as a seal configured to prevent a liquid from leaking from the mouth portion 2*a* of the preform 2.

The rotating speed of the preform 2 by the rotary drive portion 40 is appropriately set according to the type, the viscosity, and the like of the liquid L.

In the case illustrated in FIG. 2, although the rotary drive portion 40 is configured to rotate the preform 2 about the axial center of its mouth portion 2*a* by rotating the holding portion 40*a* that is provided on the tip side of the blow nozzle 23 and holds the mouth portion 2*a* of the preform 2, it is not limited thereto, and configuration thereof can be changed in various manners as long as the preform 2 can be rotated about the axial center of its mouth portion 2*a*. Examples of the configuration include, for example: a bottom pin protruding from the bottom portion of the mold 10 toward the inside of the cavity 11 is provided, the bottom portion of the preform 2 is held by the bottom pin, and the preform 2 is rotated about the axial center of the mouth portion 2*a* by rotating the bottom pin; the preform 2, along with the mold 10, may be rotated about the axial center of its mouth portion 2*a* by rotating the mold 10 with a neck portion of the preform 2 held by the mold 10; and, the mouth portion 2*a* of the preform 2 is held by the holding portion provided at the end of the arm member inserted into between the mold 10 and the nozzle unit 20 from the side, and the preform 2, along with the arm member, are rotated about the axial center of the mouth portion 2*a* by rotating the arm member.

It is to be noted that, as the rotary drive portion 40, when the following configuration, which is, a configuration in which the preform 2 is rotated about the axial center of its mouth portion 2*a* by rotating the holding portion 40*a* that is provided on the tip side of the blow nozzle 23 and holds the mouth portion 2*a* of the preform 2 by the drive mechanism 40*b*, or a configuration in which the mouth portion 2*a* of the preform 2 is held by a holding portion provided at the end of the arm member inserted into between the mold 10 and the nozzle unit 20 from the side, and the preform 2 is rotated about the axial center of its mouth portion 2*a* along with the arm member by rotating the arm member, is employed, the mouth portion 2a not stretched is held. As a result, the preform 2 can be prevented from being deformed easily, and thus is preferable.

Operation of the nozzle unit 20, the seal body 26, the stretching rod 28, the pump 30, the opening-closing valves V1 and V2, the rotary drive portion 40 and the like are controlled by a controller (not illustrated) in an integrated manner. This control can be performed with reference to the values and the like of the pressure gauge 32. Preferably, the opening-closing valves V1 and V2 are each configured as a solenoid valve that can be controlled by the controller.

Next, a method of molding a liquid container C, which is a container of a predetermined shape containing a liquid (content liquid) L, from the synthetic resin preform 2 by using the liquid blow molding apparatus 1 configured in the above described manner (the liquid blow molding method according to this embodiment) will be described.

Figure 3:
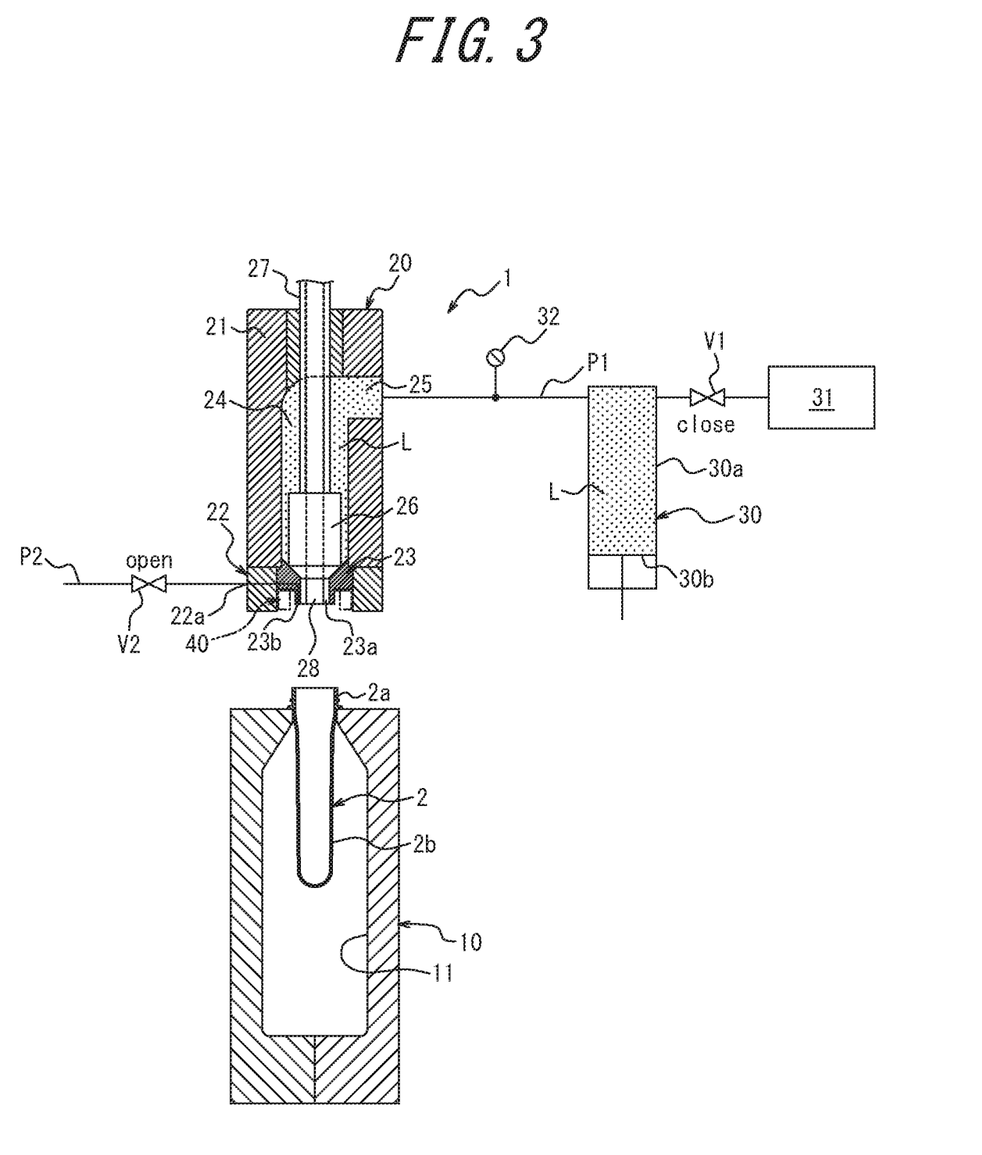
FIG. 3 is a diagram illustrating the liquid blow molding apparatus in a state where a preform is set in a mold.

First, as illustrated in FIG. 3, in a state where the nozzle unit 20 is separated upward from the mold 10 for blow molding, the synthetic resin preform 2 is placed in the mold 10 and is clamped, the preform 2 having been preheated, by using a heating means (not illustrated) such as a heater, to a predetermined temperature (e.g. from 80° C. to 150° C.) at which stretchability is achieved. When the clamping is completed, the preform 2 will be in a state where the mouth portion 2a projects upward from the upper surface of the mold 10 and the body portion 2b is disposed inside the cavity 11

When the preform 2 is placed in the mold 10, next, the nozzle engagement step is performed. In the nozzle engagement step, the nozzle unit 20 is displaced relatively toward the mold 10 to allow the blow nozzle 23 to be engaged with the mouth portion 2a of the preform 2 in a liquid-tight manner. FIGS. 1 and 2 illustrate a completion state of the nozzle engagement step where the blow nozzle 23 is engaged with the mouth portion 2a of the preform 2 in a liquid-tight manner. When the nozzle engagement step is completed, the inner periphery of the mouth portion 2a of the preform 2 is held by the holding portion 40a of the rotary drive portion 40 and is sealed in a liquid-tight manner. In a state where the nozzle engagement step is completed, the seal body 26 and the opening-closing valve V1 are closed, and the opening-closing valve V2 is open. Further, the stretching rod 28 is held at its original position at which the stretching rod does not protrude downward from the blow nozzle 23.

Figure 4:
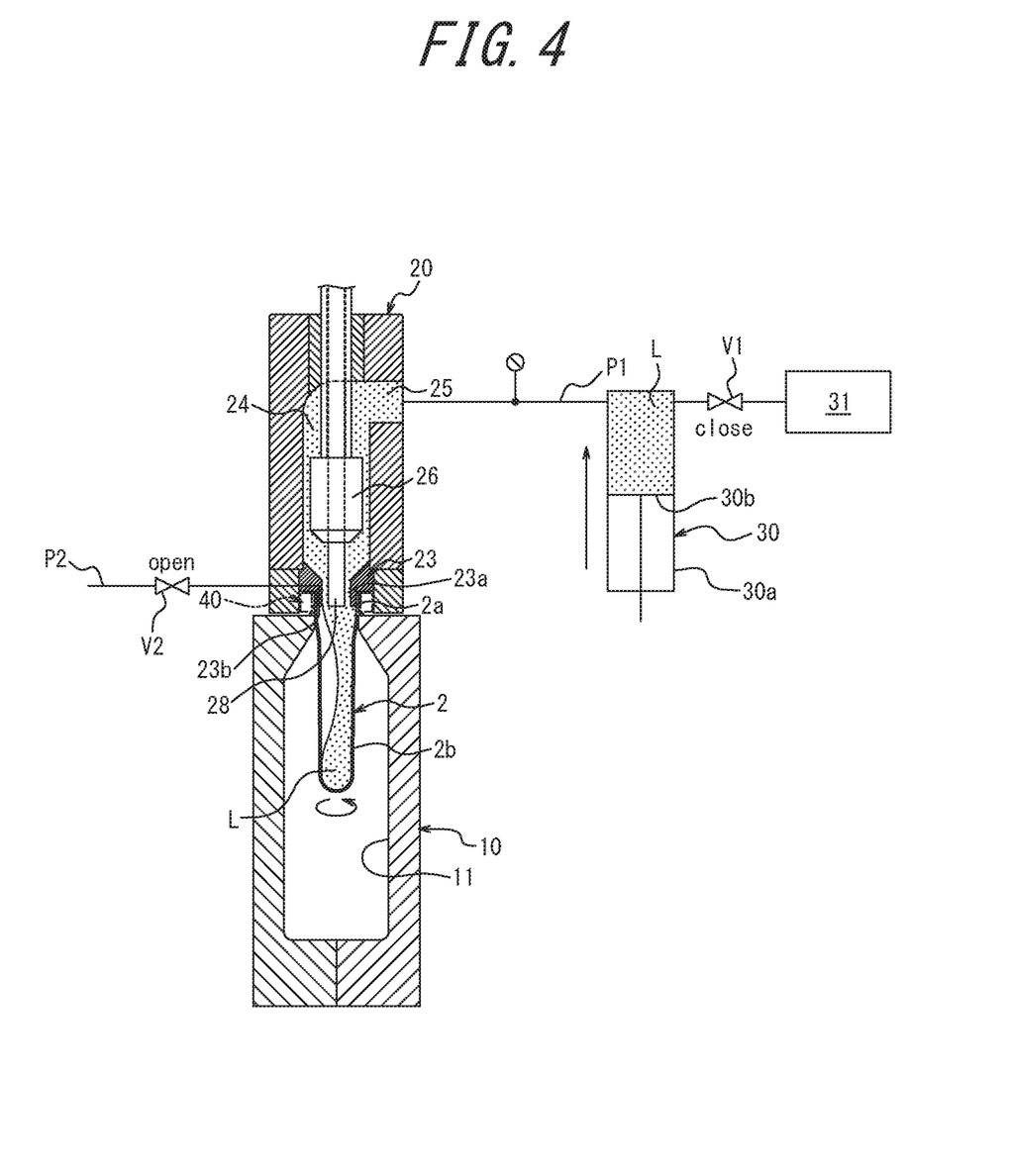
FIG. 4 is a diagram illustrating the liquid blow molding apparatus in a state where an air-liquid separation step is performed while an air-liquid replacement step is performed.

When the nozzle engagement step is completed, next, the air-liquid replacement step is performed. In the air-liquid replacement step, as illustrated in FIG. 4, the seal body 26 is displaced upward with the opening-closing valve V2, that is, the exhaust port 23b, is open to open the liquid supply port 23a of the blow nozzle 23, and in that state the pump 30 is operated toward the positive direction (the pressurized direction). When the pump 30 is operated, the liquid L is supplied into the preform 2 through the pipe P1, the supply port 25, the supply channel 24 and the liquid supply port 23a of the blow nozzle 23.

Figure 5:
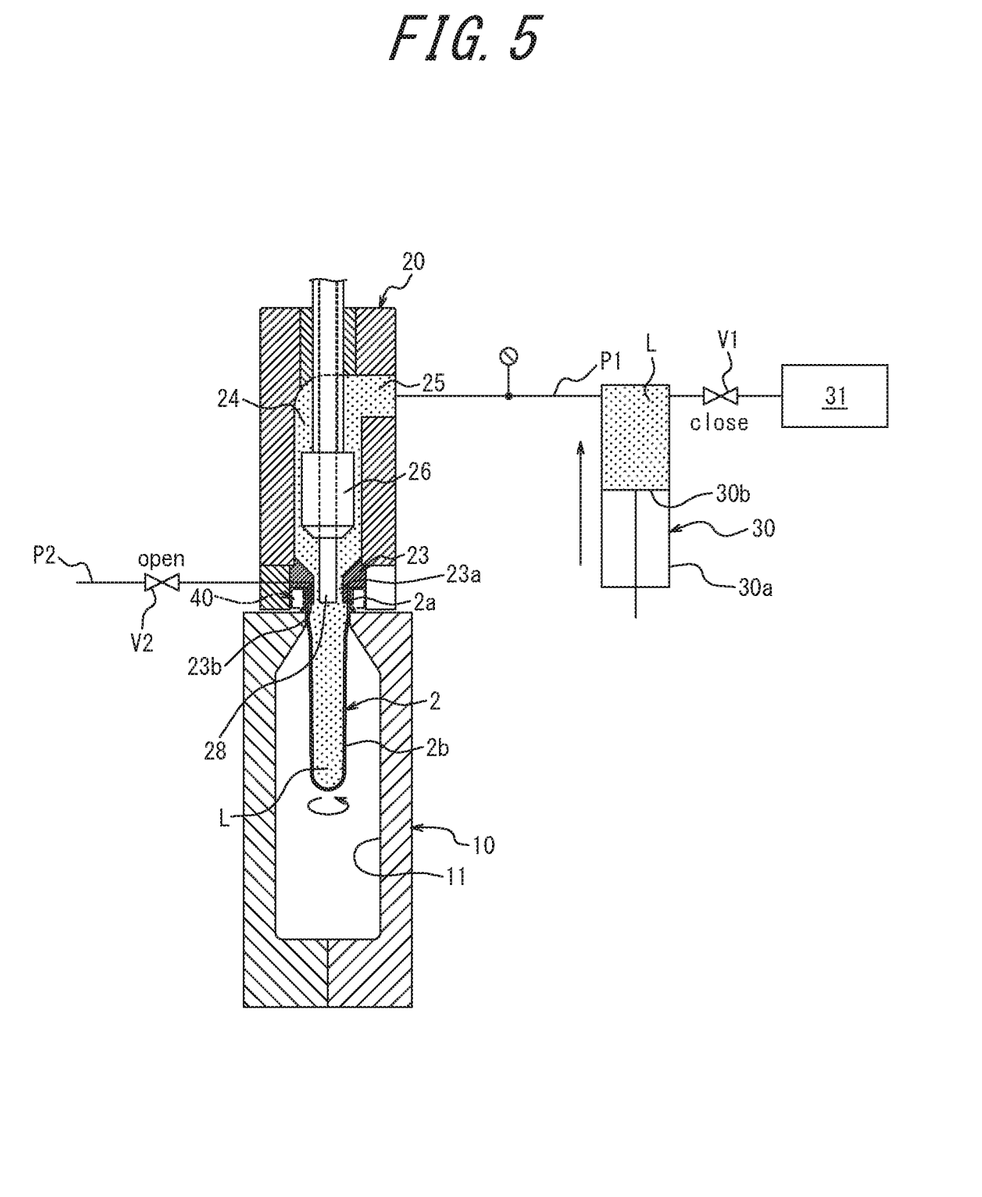
FIG. 5 is a diagram illustrating the liquid blow molding apparatus in a state where the air-liquid replacement step is completed.

Here, in the air-liquid replacement step, the liquid L is supplied into the preform 2 in a state where the exhaust port 23b provided in the blow nozzle 23 is open and the preform 2 communicates with the exhaust tank. Thus, the air inside the preform 2 is pushed out from the exhaust port 23b toward the exhaust tank as the liquid L is supplied into the preform 2, and the air inside the preform 2 is replaced with the liquid L. That is, the air-liquid replacement step allows the air inside the preform 2 to be replaced with the liquid L, and as illustrated in FIG. 5, allows the preform 2 having the shape before the blow molding is applied thereto to be filled with the liquid L.

In the air-liquid replacement step, preferably, a predetermined amount of liquid L is supplied into the preform 2 at a pressure lower than that of the blow molding step described below. That is, in the air-liquid replacement step, preferably, an output of the pump 30 is adjusted such that the liquid L is supplied at a pressure with which the preform 2 is not liquid blow molded or is liquid blow molded a little, and is operated.

In the disclosed liquid blow molding method, in order to reduce the amount of the air remaining in the preform 2 after the air-liquid replacement step, the air-liquid separation step is performed before the preform 2 is blow molded. In the air-liquid separation step, the rotary drive portion 40 is operated to rotate the preform 2 about the axial center of its mouth portion 2a so as to separate the air from the liquid L inside the preform 2. When the air is separated from the liquid L in the preform 2, the air mixed in the liquid L is displaced to the mouth portion 2a side of the preform 2, and is exhausted efficiently to the outside from the exhaust port 23b provided in the blow nozzle 23.

In this embodiment, the air-liquid separation step is performed while the air-liquid replacement step is performed. That is, in this embodiment, as illustrated in FIGS. 4 and 5, the air-liquid replacement step is performed in a state where the preform 2 is rotated about the axial center of its mouth portion 2a by the rotary drive portion 40, and the liquid L is supplied into the rotating preform 2 through the liquid supply port 23a of the blow nozzle 23. The liquid L supplied into the preform 2 flows in a spiral from the mouth portion 2a side to the bottom side while being pushed toward the inner surface of the body portion 2b of the preform 2 by centrifugal force. Then, the liquid L is separated from the air and accumulates on the bottom side of the preform 2. On the other hand, the air separated from the liquid L is displaced to the upper part of the preform 2, and is exhausted from the exhaust port 23b that is provided in the blow nozzle 23 separately from the liquid supply port 23a. In this manner, when the liquid L is supplied into the preform 2 while the preform 2 is rotated about the axial center of its mouth portion 2a, inside the preform 2 can be filled with the liquid L while the air mixed in the liquid L is separated from the liquid L and is efficiently exhausted from the exhaust port 23b to the outside. Therefore, the amount of the air remaining in the preform 2 after the air-liquid replacement step can be reduced.

In particular, when the liquid L is a liquid with a relatively high viscosity such as shampoo or liquid detergent, for example, the liquid L containing the air is supplied into the preform 2, or the liquid L supplied into the preform 2 entrains the air inside the preform 2. As a result, the liquid L may contain a lot of air. However, even in such a case, when the air-liquid separation step is performed, the air mixed in the liquid L is separated from the liquid L and can be efficiently exhausted from the exhaust port 23b to the outside.

In the disclosed liquid blow molding method, the air-liquid separation step may be performed after the air-liquid replacement step is completed, not during the air-liquid replacement step. Even in this case, in the air-liquid separation step, when the preform 2 filled with the liquid L in the air-liquid replacement step is rotated about the axial center of its mouth portion 2a, the air mixed in the liquid L can be separated from the liquid L and exhausted from the exhaust port 23b to the outside. Therefore, the amount of the air remaining in the preform 2 after the air-liquid replacement step is completed can be reduced.

It is to be noted that the air-liquid separation step can also be performed continuously over the period of during the air-liquid replacement step and after completion of the air-liquid replacement step.

In this manner, in the liquid blow molding method according to the present embodiment, when the preform 2 is rotated about the axial center of its mouth portion 2a in the air-liquid separation step, the air mixed in the liquid L in the preform 2 can be separated from the liquid L and is efficiently exhausted from the exhaust port 23b to the outside. Thus, the amount of the air remaining in the preform 2 after the air-liquid replacement step is completed can be reduced.

Figure 6:
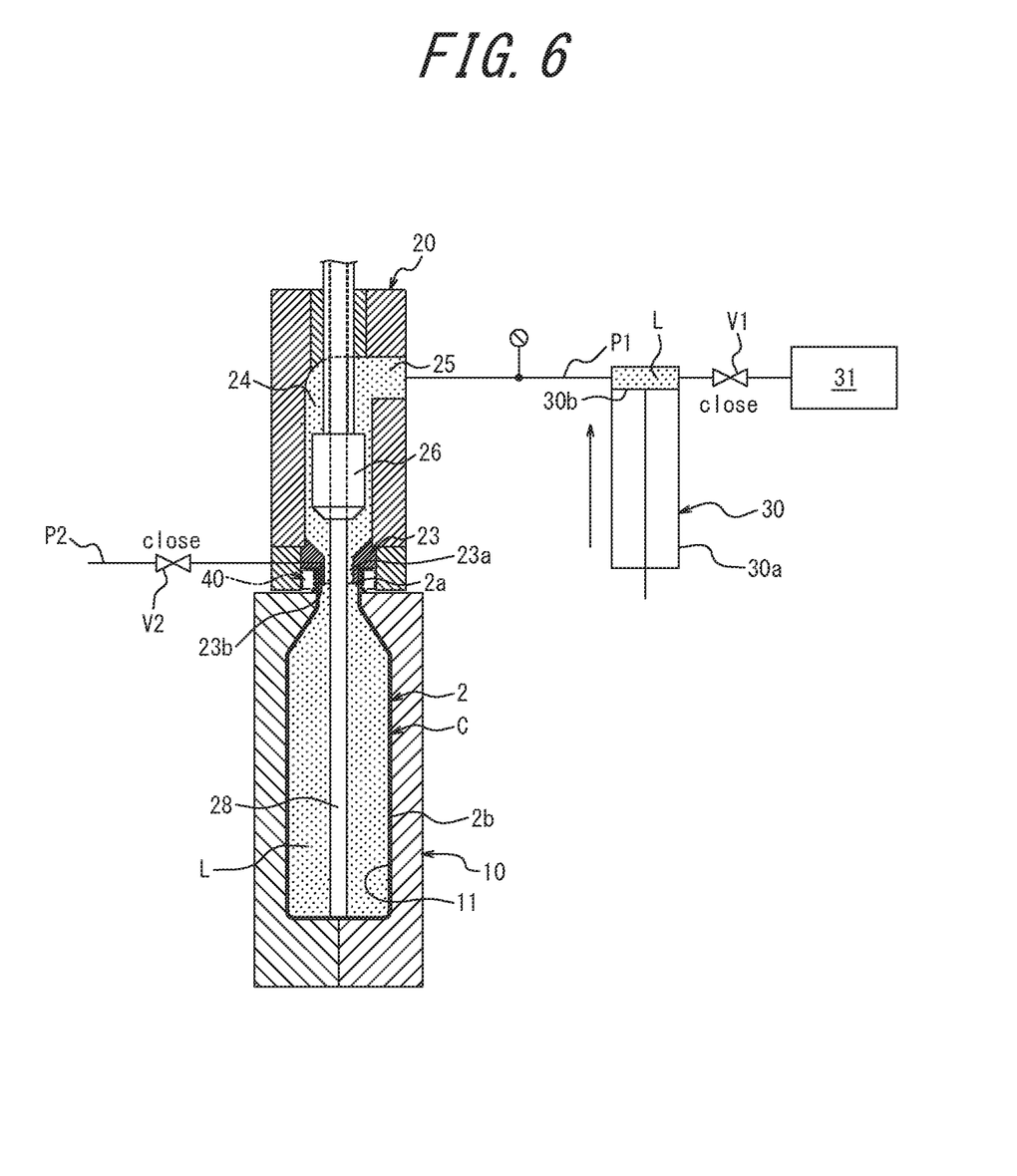
FIG. 6 is a diagram illustrating the liquid blow molding apparatus in a state where a blow molding step is performed.

When the air-liquid replacement step and the air-liquid separation step are completed, next, the blow molding step is performed. In the blow molding step, as illustrated in FIG. 6, the pump 30 is operated further in the positive direction with the opening-closing valves V1 and V2 closed, the rotary drive portion 40 stopped and the liquid supply port 23a remained open by the seal body 26. At this time, the pump 30 is operated with an output that allows the pressure of the liquid L supplied into the preform 2 to be a predetermined pressure at which the preform 2 can be liquid blow molded. In this manner, when the liquid L pressurized to a predetermined pressure is further supplied into the preform 2 filled with the liquid L, the preform 2 is stretched in an expansion manner by the pressure of the liquid L, and, as illustrated in FIG. 6, when the preform 2 is molded (liquid blow molded) into a liquid container C of a predetermined shape conforming to the inner surface of the cavity 11, operation of the pump 30 is stopped and the blow molding step is completed.

Here, as described above, the air inside the preform 2 is replaced with the liquid L in the air-liquid replacement step, and the amount of the air remaining in the preform 2 is further reduced by performing the air-liquid separation step. Thus, in the blow molding step, bubbling of the liquid L inside the preform 2 caused by entraining of the air into the liquid L that is supplied into the preform 2 can be prevented. In this manner, it is possible to stabilize the molding conditions and enhance the moldability of the container. Consequently, a liquid container C having a predetermined content volume and a shape can be manufactured precisely and at a low cost.

When the stretching rod 28 is provided to the liquid blow molding apparatus 1, the stretching rod 28 is displaced forward into the preform 2 in the blow molding step, and the preform 2 is stretched by the stretching rod 28 in the axial (longitudinal) direction. In this manner, a biaxial stretch blow molding in which a preform 2 is biaxially stretched by a pressure of the liquid L and the stretching rod 28 can be performed. According to the biaxial stretch blow molding, the preform 2 can be molded into a liquid container C of a predetermined shape more precisely.

In the present embodiment, after the blow molding step is completed, the suck-back step is performed.

Figure 7:
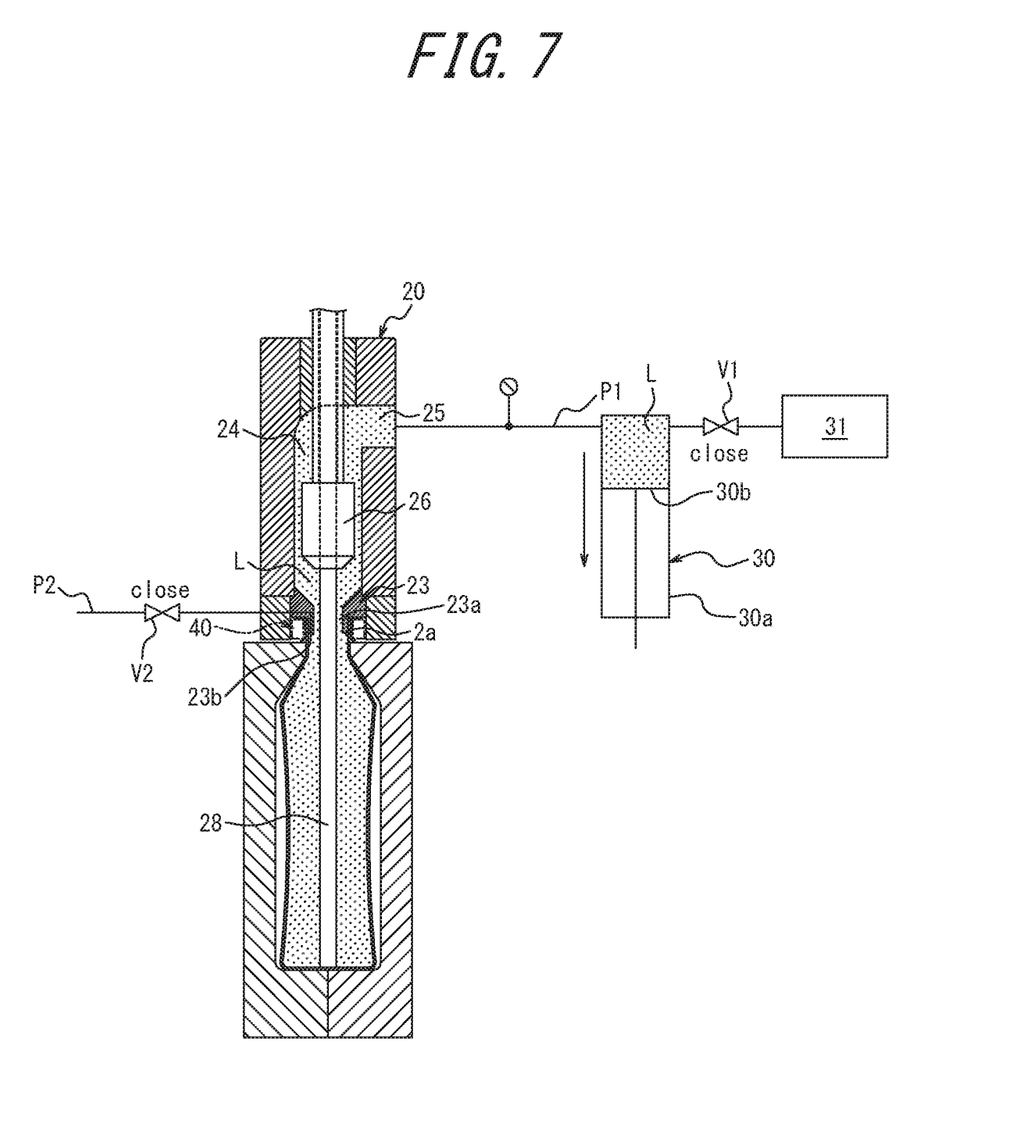
FIG. 7 is a diagram illustrating the liquid blow molding apparatus in a state where a suck-back step is performed.

As illustrated in FIG. 7, in the suck-back step, the seal body 26 is at an open position and the liquid supply port 23a of the blow nozzle 23 is kept open. In this state the pump 30 is operated in the reverse direction and a predetermined amount of liquid L is sucked back from the inside of the liquid container C molded into a predetermined shape in the blow molding step to the supply channel 24 through the liquid supply port 23a. The amount of the liquid L sucked back to the supply channel 24 in the suck-back step is appropriately set such that a headspace HS provided in a completed liquid container C has a predetermined volume. When the suck-back step is performed, the content volume of the liquid container C is reduced by the amount of the liquid L sucked back to the supply channel 24. Then, the liquid container C is deformed due to volume reduction, and in which sate a gap is generated between the container C and the cavity 11. The inside thereof is in a state of a negative pressure that is lower than the atmospheric pressure.

At this time, the amount of the air remaining in the preform 2 is further reduced by replacing the air in the preform 2 with the liquid L in the air-liquid replacement step and performing the air-liquid separation step. Thus, even if the liquid L is sucked back from the liquid container C to the supply channel 24, not much air is mixed in the liquid L in the supply channel 24, and deterioration of moldability or the like will not occur in the subsequent liquid blow molding step.

Figure 8:
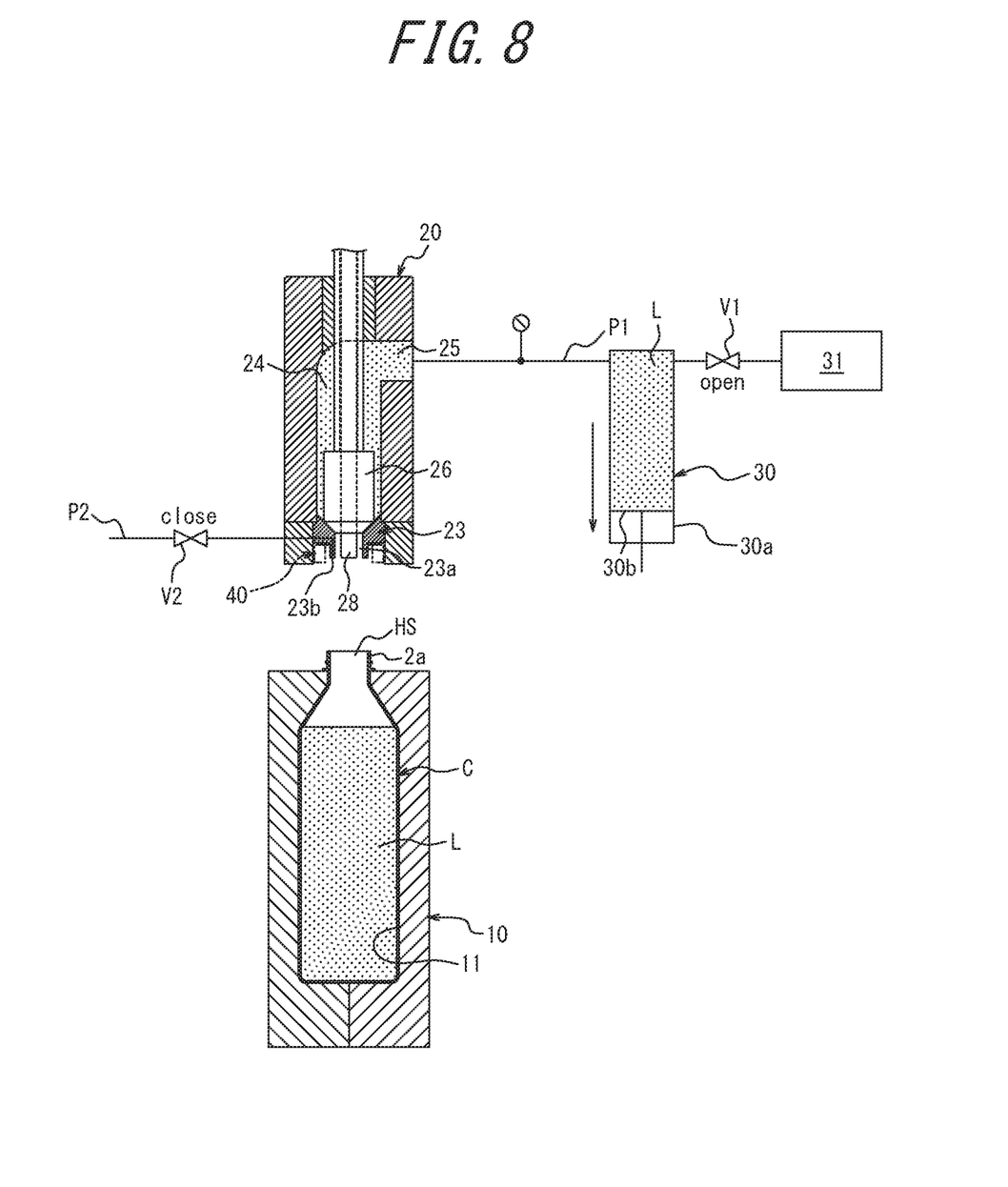
FIG. 8 is a diagram illustrating the liquid blow molding apparatus in a state where a blow nozzle is separated from a mouth portion of a container after molding.

When the suck-back step is completed, next, the liquid supply port 23a of the blow nozzle 23 is closed by the seal body 26 with a predetermined amount of liquid L sucked back from the inside of the liquid container C molded into a predetermined shape to the supply channel 24 in the suck-back step. Then after that, as illustrated in FIG. 8, the nozzle unit 20 is displaced relatively in the direction separating from the mold 10, and the blow nozzle 23 is separated from the mouth portion 2a of the preform 2 to release engagement of the blow nozzle 23 with the mouth portion 2a. When the blow nozzle 23 is separated from the mouth portion 2a of the liquid container C after molding, the liquid container C, which is in a state of deformation due to volume reduction in the suck-back step, is restored to its original shape, and a head space HS having a predetermined volume is formed above a predetermined amount of liquid L inside the liquid container C. It is to be noted that a head space HP may also be formed by opening the opening-closing valve V2 before the blow nozzle 23 is separated to allow communication with the air such that the liquid container C deformed due to volume reduction in the suck-back step is restored to its original shape.

Further, in the above described state, a cap is attached to the mouth portion 2a by a capping apparatus not illustrated, and subsequently the mold 10 is opened to eject a completed liquid container C from the mold 10. It is to be noted that a cap may be attached after the liquid container C is ejected from the mold 10.

When the stretching rod 28 is provided to the liquid blow molding apparatus 1, the stretching rod 28 may be pulled out from the liquid container C after the liquid supply port 23a of the blow nozzle 23 is closed by the seal body 26. In this manner, compared with the case where the stretching rod 28 is not provided to the liquid blow molding apparatus 1, a volume of the head space HS can be increased further by the volume of the stretching rod 28. In this case, the amount of liquid L sucked back from the inside of the liquid container C to the supply channel 24 in the suck-back step may be set in consideration of the volume of the stretching rod 28 inserted into the liquid container C.

As described above, in the liquid blow molding method according to the present embodiment, the air inside the preform 2 is replaced with the liquid L in the air-liquid replacement step, and the amount of the air remaining in the preform 2 is further reduced by performing the air-liquid separation step. In this manner, bubbling of the liquid L in the preform 2 caused by entrainment of the air into the liquid L that is supplied into the preform 2 in the blow molding step is prevented, and the liquid container C can be manufactured so that it has a predetermined content volume and a shape precisely and at a low cost.

At this time, in the air-liquid replacement step, a predetermined amount of liquid L is supplied into the preform 2 at a pressure lower than that in the liquid blow molding. Thus the air in the preform 2 can be replaced with the liquid L without causing bubbling of the liquid L.

Further, in the liquid blow molding method according to the present embodiment, since the air-liquid separation step is performed while the air-liquid replacement step is performed, the liquid L supplied into the preform 2 in the air-liquid replacement step flows in a spiral from the mouth portion 2a side to the bottom side while being pushed toward the inner surface of the body portion 2b of the preform 2 by centrifugal force of the preform 2, which is rotated in the air-liquid separation step, and as a result the air can be efficiently separated from the liquid L supplied to the preform 2. In this manner, the amount of the air remaining in the preform 2 can be further reduced.

Moreover, when the air-liquid separation step is performed after the air-liquid replacement step is completed, the air remaining on the bottom of the preform 2 is also reliably separated from the liquid L. In this manner, the amount of the air remaining in the preform 2 can be further reduced.

Furthermore, in the liquid blow molding method according to the present embodiment, in the air-liquid separation step, since the preform 2 is held by the holding portion 40a provided to the blow nozzle 23, and the preform 2 is rotated along with the holding portion 40a, the preform 2 can be rotated securely without being deformed. In this manner, a liquid container C can be molded from the preform 2 more precisely.

Furthermore, in the liquid blow molding method according to the present embodiment, the method has, before the air-liquid replacement step, the nozzle engagement step of engaging the blow nozzle 23 with the mouth portion 2a, and in the air-liquid replacement step, the air inside the preform 2 is exhausted to the outside from the exhaust port 23b provided in the blow nozzle 23 separately from the liquid supply port 23a while the liquid L is supplied into the preform 2 from the mouth portion 2a through the liquid supply port 23a of the blow nozzle 23. Thus the air inside the preform 2 can be exhausted to the outside without leaking the liquid L to the outside.

The present disclosure is not limited to the above described embodiment, and it is needless to say that various modifications may be made without departing from the spirit of the present disclosure.

For example, although the above described embodiment illustrates a case where the disclosed liquid blow molding method is performed by using the liquid blow molding apparatus 1 configured as illustrated in FIG. 1, the disclosed liquid blow molding method can be performed by using a liquid blow molding apparatus and the like having the other configurations.

Further, in the above described embodiment, although the exhaust port 23b configured to exhaust the air inside the preform 2 to the outside in the air-liquid replacement step is provided to the blow nozzle 23, it may be provided to the other part such as the stretching rod 28, for example.

Moreover, according to the above described embodiment, in the air-liquid separation step, the mouth portion 2a of the preform 2 is held by the holding portion 40a provided on the tip side of the blow nozzle 23, and the preform 2 is rotated about the axial center of its mouth portion 2a by rotating the holding portion 40a by the drive mechanism 40b. However, it is not limited thereto, and as long as the preform 2 can be rotated about the axial center of its mouth portion 2a, the preform 2 may be rotated as follows; the preform 2 can be rotated about the axial center of its mouth portion by holding the bottom portion of the preform 2 by a bottom pin protruding from the bottom of the mold 10 toward the inside of the cavity 11, and rotating the bottom pin; the preform 2 can be rotated about the axial center of its mouth portion 2a along with the mold 10 by rotating the mold 10 with the neck portion of the preform 2 held by the mold 10; or the preform 2, along with an arm member, are rotated about the axial center of its mouth portion 2a by holding the mouth portion 2a of the preform 2 by a holding portion provided at the end of the arm member and by rotating the arm member (holding portion), the arm member being inserted into between the mold 10 and the nozzle unit 20 from the side. As described above, the configuration of rotating the preform 2 can be changed in various manners.

Further, the rotating speed and the rotating direction of the preform 2 by the rotary drive portion 40 can be changed in various manners.

Furthermore, in the above described embodiment, although the air inside the preform 2 is exhausted to the outside from the exhaust port 23b provided in the blow nozzle 23 in the air-liquid replacement step, it is not limited thereto, and the blow nozzle 23 may be lowered to a first position at which the mouth portion 2a is not sealed (a first nozzle lowering step) before the air-liquid replacement step, and, in the air-liquid replacement step, the air in the preform 2 may be exhausted to the outside from a gap between the blow nozzle 23 and the mouth portion 2a while the liquid L is supplied into the preform 2 from the mouth portion 2a through the blow nozzle 23 located at the first position. In this case, after the air-liquid replacement step, the blow nozzle 23 is lowered to a second position at which the mouth portion 2a is sealed (a second nozzle lowering step), and after that the blow molding step is performed. In this manner, the need to provide the exhaust port 23b in the blow nozzle 23 is eliminated, thus the configuration of the liquid blow molding apparatus 1 is simplified, and a manufacturing cost of the liquid container C molded according to the liquid blow molding method can be reduced.

It is to be noted that, in the above described configuration, the blow nozzle 23 or the rotary drive portion 40 can be configured in various manners. Examples of the configuration include, for example: the rotary drive portion 40 is fitted in advance to the mouth portion 2a of the preform 2 in a liquid-tight manner, and the air inside the preform 2 is exhausted from a gap between the blow nozzle 23 and the rotary drive portion 40 to the outside when the blow nozzle 23 is lowered to the first position, then after that, the gap between the blow nozzle 23 and the rotary drive portion 40 is closed when the blow nozzle 23 is lowered to the second position; or, when the blow nozzle 23 is lowered to the first position, the rotary drive portion 40 is fitted to the mouth portion 2a of the preform 2 in a liquid-tight manner and the air inside the preform 2 is exhausted from an exhaust channel provided to the rotary drive portion 40 to the outside, then after that, the exhaust channel of the rotary drive portion 40 is closed when the blow nozzle 23 is lowered to the second position.

Moreover, in the above described embodiment, although a head space HS is increased by performing a biaxial stretch blow molding by using the stretching rod 28 in the blow molding step and pulling the stretching rod 28 out from the liquid container C as well, a head space HS may not be formed by using the stretching rod 28 (e.g., the stretching rod 28 may be pulled out before the blow molding step is finished).

Furthermore, in the above described embodiment, although the pump 30 is a plunger pump, it is not limited thereto, and a variety of pumps can be used as long as the liquid L can be supplied to the preform 2 after it is pressurized to a predetermined pressure and a predetermined amount of liquid L can be sucked back from a liquid container C after molding.

Moreover, the disclosed liquid blow molding method may preferably be applied to a case where a container needed to be provided with a large head space HS therein, such as a liquid container C used for a container with a pump configured to contain a content liquid with a relatively high viscosity such as shampoo, liquid detergent, and the like, is molded. However, the method may be applied to mold a variety of liquid containers C regardless of the size of the head space HS.

Furthermore, although the air-liquid separation step may be performed during or after the blow molding step, the blow molding step is performed with the preform 2 sealed, in principle. Therefore it is difficult to remove the air separated from the liquid L to the outside. Thus, the air-liquid separation step may preferably be performed at the same time of the air-liquid replacement step, or after the air-liquid replacement step and before the blow molding step.

REFERENCE SIGNS LIST

1 Liquid blow molding apparatus
2 Preform
2*a* Mouth portion
2*b* Body portion
10 Mold
11 Cavity
20 Nozzle unit
21 Main body block
22 Support block
22*a* Connection port
23 Blow nozzle
23*a* Liquid supply port
23*b* Exhaust port
23*c* Connection port
24 Supply channel
25 Supply port
26 Seal body
27 Shaft body
28 Stretching rod
30 Pump
30*a* Cylinder
30*b* Piston
31 Supply tank
40 Rotary drive portion
40*a* Holding portion
40*b* Drive mechanism
P1 Pipe
V1 Opening-closing valve
P2 Pipe
V2 Opening-closing valve
C Liquid container

The invention claimed is:

1. A liquid blow molding method of molding a synthetic resin preform having a mouth portion into a liquid container of a predetermined shape, the method comprising:
    an air-liquid replacement step of exhausting the air inside the preform to an outside while a liquid is supplied into the preform from the mouth portion through a blow nozzle;
    an air-liquid separation step of separating the air from a liquid inside the preform by rotating the preform about an axial center of the mouth portion; and
    a blow molding step of molding the preform into a container of a predetermined shape by supplying a pressurized liquid into the preform from the mouth portion through the blow nozzle, after the air-liquid separation step.

2. The liquid blow molding method according to claim 1, wherein the air-liquid separation step is performed while the air-liquid replacement step is performed.

3. The liquid blow molding method according to claim 1, wherein the air-liquid separation step is performed after the air-liquid replacement step is completed.

4. The liquid blow molding method according to claim 1, wherein, in the air-liquid separation step, the preform is held by a holding portion provided to the blow nozzle and is rotated along with the holding portion.

5. The liquid blow molding method according to claim 1, wherein,
    the method comprises a nozzle engagement step of engaging the blow nozzle with the mouth portion, before the air-liquid separation step; and
    in the air-liquid separation step, while a liquid is supplied into the preform from the mouth portion through a liquid supply port of the blow nozzle, the air inside the preform is exhausted to the outside from an exhaust port provided in the blow nozzle separately from the liquid supply port.

6. The liquid blow molding method according to claim 1, wherein, the method comprises:
    a first nozzle lowering step of lowering the blow nozzle to a first position at which the mouth portion is not sealed, before the air-liquid replacement step; and
    a second nozzle lowering step of lowering the blow nozzle to a second position at which the mouth portion is sealed, after the air-liquid replacement step, wherein,
    in the air-liquid replacement step, while a liquid is supplied into the preform from the mouth portion through the blow nozzle located at the first position, the air inside the preform is exhausted to the outside from a gap between the blow nozzle and the mouth portion; and
    the blow molding step is performed after the second nozzle lowering step.

7. The liquid blow molding method according to claim 1, wherein, the method comprises a suck-back step of sucking back a predetermined amount of liquid from an inside of the container after molding through the blow nozzle, after the blow molding step.

* * * * *